United States Patent [19]

Casalou

[11] 4,074,125

[45] Feb. 14, 1978

[54] SPOT LIGHT ASSEMBLY

[75] Inventor: Robert A. Casalou, Birmingham, Mich.

[73] Assignee: Robert A. Casalou, Inc., Southfield, Mich.

[21] Appl. No.: 629,005

[22] Filed: Nov. 5, 1975

[51] Int. Cl.² .............................................. F21M 3/18
[52] U.S. Cl. ..................................... 362/271; 362/423
[58] Field of Search ................ 240/61.13, 61.12, 61.11

[56] References Cited

U.S. PATENT DOCUMENTS

| 1,756,531 | 4/1930 | Aldeen et al. ...................... 240/61.13 |
| 2,191,049 | 2/1940 | Tornblom .......................... 240/61.13 |
| 2,634,364 | 4/1953 | Sklarek .............................. 240/61.13 |

Primary Examiner—J D Miller
Assistant Examiner—E. Tyler
Attorney, Agent, or Firm—Cullen, Settle, Sloman & Cantor

[57] ABSTRACT

A spot light assembly includes a support tube journalled upon a frame, having a handle assembly secured over one end of the tube and a head assembly secured over the other end of the tube and mounting a spot light. Rotation of the handle assembly in a vertical plane effects the corresponding angular adjustment of the spot light. A rotatable drive shaft within the tube at its ends extends respectively into the handle assembly and head assembly. An upright stud is supported in the head assembly. The handle assembly includes a handle rotatable in a horizontal plane. Intermeshing gears on the handle, on end portions of the drive shaft and on the stud are connected to the spot light whereby rotation of the handle in a horizontal plane effects a corresponding rotation of the spot light. The improvement lies in the drive shaft at one end being in brush contact with the stud. A lead wire interconnects the stud and spot light, and a normally open switch in the head assembly is connected to an electrical power source and includes a spring-biased retracted contact spaced from the other end of the drive shaft. The drive shaft within the support tube and the gears thereon, and the drive gear in the handle assembly and the driven gear in the head assembly are all insulated. The drive shaft is removable from the spot light assembly so that it is possible to cut the drive shaft and the support tube to any desired length at point of installation on a vehicle.

2 Claims, 4 Drawing Figures

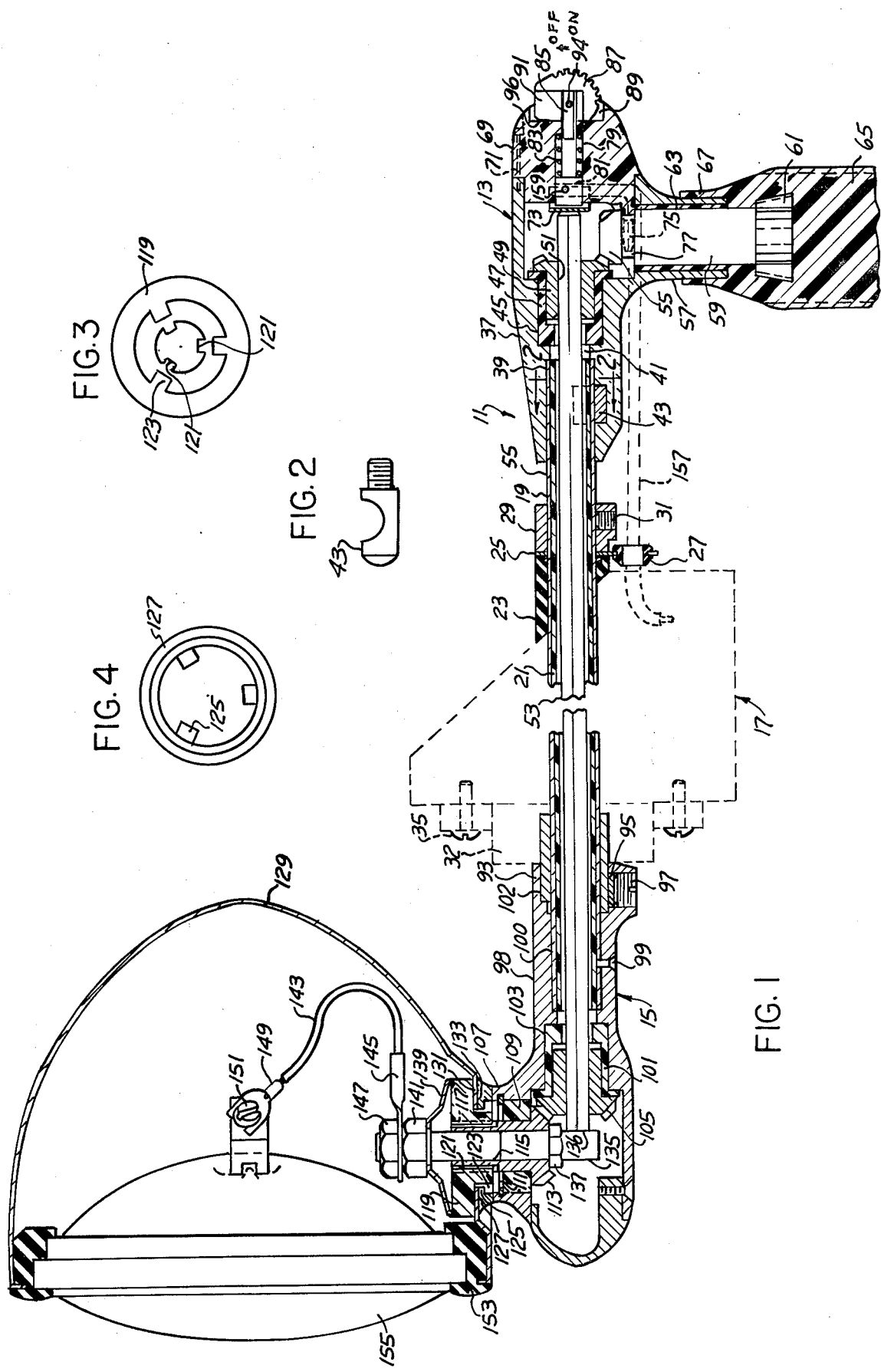

SPOT LIGHT ASSEMBLY

BACKGROUND OF THE INVENTION

Conventional spot light assemblies have included a support tube which is journalled and mounted upon a frame, a handle assembly secured to the tube at one end, and a head assembly secured to the other end of the tube for mounting a spot light. Rotation of the handle assembly in a vertical plane effects a corresponding adjustment of the spot light in a vertical plane. Conventional spot light assemblies also include a rotatable drive shaft within the tube with its ends extending into the handle assembly and head assembly. An upright within the head assembly provides a mounting for the spot light. Intermeshing gear means in a conventional manner are respectively mounted upon the handle upon opposite ends of the drive shaft and on the stud for connection with the spot light whereby rotation of the handle in a horizontal plane effects corresponding rotation of the spot light in a horizontal plane.

This is the basic conventional structure of normal vehicle spot light assemblies whereby upon the interior of the vehicle, universal adjustment of the handle assembly is adapted to cause universal adjustment of the spot light upon the exterior of the vehicle.

SUMMARY OF THE INVENTION

It is an object of the present invention to provide an improved spot light assembly wherein the drive shaft performs the additional function of transmitting electrical power from a switch within a handle assembly to the spot light upon the head assembly. This eliminates wiring extending through the support tube between the switch and the spot light.

This provides the advantage that one spot light assembly may be adapted for any size vehicle merely by fore-shortening to the extent desired the support tube and its internal drive shaft.

It is another object of the present invention to provide an electrical brush contact between the drive shaft and the head light supporting stud shaft within the head assembly for transmitting electrical power to said stud.

These and other objects will be seen from the following specification and Claims in conjunction with the appended drawing.

THE DRAWING

FIG. 1 is a partially broken away longitudinal section of the present spot light assembly;

FIG. 2 is a side view of the support tube clamp for the handle assembly taken in the direction of arrows 2—2 of FIG. 1;

FIG. 3 is a plan view of the nylon-locking ring which mounts the spot light shell;

FIG. 4 is a plan view of the retaining washer for the spot light shell.

It will be understood that the above drawing illustrates merely a preferred embodiment of the invention, and that other embodiments are contemplated within the scope of the Claims hereafter set forth.

DETAILED DESCRIPTION OF THE INVENTION

Referring to the drawings, the spot light assembly, generally indicated at 11, includes handle assembly 13 normally arranged upon the interior of a vehicle, and a head assembly 15 normally arranged upon the exterior of the vehicle with respect to the vehicle framework such as the pillar 17 shown in dash lines.

The spot light assembly includes an elongated support tube 19 having nested upon its interior and throughout its length an insulation tube 21 of plastic material such as Teflon.

Rubber spacer 23 bears against said pillar upon the interior of the vehicle, and against said spacer is a collar 29 secured to the support tube by set screw 31 with apertured wire guide 25 interposed between said spacer and collar. The depending portion of the wire guide mounts a rubber or plastic grommet 27 adapted to receive power wire 157 hereafter described.

Mounting bracket 32 receives the support tube upon the exterior of the vehicle, bears against the pillar 17 and is secured thereto at 35.

HANDLE ASSEMBLY

The handle assembly 13 includes metallic housing 37 open at its opposite ends, including bore 39 terminating in shoulder 41, adapted to receive one end of support tube 19 which bears against said shoulder and is firmly retained with respect to said housing by the transverse tube clamp 43 shown in further detail in FIG. 2.

Housing 37 includes counterbore 45 which receives and anchors nylon bushing 47 for bevel gear 49, one of a series of intermeshing gear means hereafter described. Said bevel gear has a bore 51 of square cross section to drivingly receive an end portion of the elongated conductive drive bar 53 which is axially disposed within the support tube 19 and extends into housing 37.

Upon the interior of said housing and forming a part of said gear means is the drive pinion 55 in mesh with bevel gear 49.

Said pinion has secured thereto as a part thereof the depending shank 59 which is axially disposed through depending boss 57 of said housing with an insulating nylon sleeve 63 interposed between said housing and shank.

Said shank terminates in a fluted anchor portion 61 which is molded into or otherwise secured within the plastic handle 65.

Said handle at its upper portion has an annular hollow flange 67 which guidably extends over and around the boss 57 of the housing and which receives the lower end portion of the nylon sleeve 63.

Plastic switch cap 69 is assembled into the open end of the housing 37 and is suitable secured thereto by fasteners 71.

The end thrust contact plate 73 of copper is anchored upon said cap and bears against the inner end of the drive bar 53 retaining said bar against endwise movement relative to the housing, in one direction.

The bifurcated tongue 75 forms a part of the switch cap 69 and extends into the annular groove or slot 77 formed in shank 59 for retaining said shank and the assembled handle with respect to housing 37.

With this construction the handle can rotate in a vertical plane causing a corresponding rotation of support tube 19. Said handle can also rotate in a horizontal plane with respect to housing 37 for causing a rotative drive of the square shaft 53 by the intermeshing gears 49 and 55.

Bore 79 formed within the switch cap 69 is coaxial of drive bar 53 and receives the cylindrical contact 81 biased to engagement with contact 73 by the coil spring 83 within said bore. Said contact terminates in an axial shank 85 which extends outwardly of said housing through the switch cap 69 and into the slot 89 therein.

The plastic knurled switch 87 shown in the "on position" in FIG. 1 is pivotally mounted by a suitable pin at 94 on shank 85 with the bifurcated portions 91 of said switch which receive shank 85 bearing against a portion of the switch cap within slot 89. By rotating the switch in a counterclockwise direction about pivot 94 the bifurcated portions of said switch cam as at 96 against the switch cap so as to retract the contact 81 away from the contact plate 73, and against the action of spring 83.

HEAD ASSEMBLY

The head assembly includes metallic head 98 having a bore 100 adjacent one end adapted to receive one end of the support tube 19 and an adjacent counterbore 102 adapted to receive the non-metallic stop bushing 93.

A transverse adjustable set screw 97 extends radially into the head housing 98 and retainingly engages the stop bushing with a suitable friction plug 95 interposed therebetween by which the free outer end of the support tube is anchored with respect to the head housing 98.

The key or rivet 99 also extends radially into said housing and into a corresponding aperture within the support tube 19 to positively retain the support tube against relative rotary motion with respect to housing 98.

This assures that any rotation of the support tube 19 will effect a corresponding rotation of housing 98.

End thrust nylon bushing 101 is nested within the bore 103 within housing 98 and is adapted to journal bevel gear 105 that drivingly receives the drive rod 53 which projects into said housing and inwardly of bevel gear 105.

Housing 98 adjacent one end includes the upright boss 107 which receives nylon bushing 109 anchored by locking ring 111 which extends into an internal groove in said boss.

Bevel gear 113 which forms one of the series of intermeshing gear means for the present spot light assembly extends up through the nylon bushing and is mounted and journalled upon contact stud 135.

Bevel gear 113 includes the tubular shank 115 having a series of splined slots 117 which interlock with and receive the internal splines 121 adjacent the bore of the nylon locking ring 119.

Upon the shank of the nylon locking ring 119 are a series of external slots 123 which are adapted to interlockingly receive corresponding radial tongues 125 upon the retaining washer 127 which bears upon housing boss 107.

The spot light includes the hollow formed shell 129 having an apertured base 131 with corresponding radial slots 133 operatively receiving the tongues 125 upon the retaining washer 127.

The upright contact stud 135 at its lower end within housing 98 has a brush contact at 136 with the inner end of the drive rod 53. Shoulder 137 upon said stud supportably engages gear 113, extends up through said bevel gear and its tubular shank 115 and through the corresponding nylon locking ring 119, through the spring washer 139 and receives thereover the securing nut 141.

This completes the assembly clamping the base portion of the shell 129 onto the nylon locking ring and between said ring and the retaining washer for rotation therewith upon rotation of the bevel gear 113.

Accordingly, rotation of said bevel gear causes the corresponding rotation of the shell 129 in a horizontal plane.

The wire assembly 143 has a connector 145 anchored to the contact stud 135 by the nut 147, with its other end portion having a connector 149 secured by fastener 151 to the light assembly 155 mounted within an annular plastic or rubber light retainer 153 within shell 129.

The hot wire, fragmentarily shown at 157, extends through the grommet 27 and into the vehicle pillar and is adapted for connection to an electrical power source such as the vehicle battery. The other end of the hot wire 157 extends upon the exterior of housing 37 and through a suitable radial aperture extends to the interior of said housing and is suitably anchored or otherwise connected as at 159 to the movable contact 81.

The electrical circuit therefore from the battery includes the hot wire 157 to the retractable contact 81 which, when released to the "on position" shown in the drawing, transmits through contact 73 and drive rod 53 power through the brush contact 136 to the contact stud 135. Power is then transmitted to the lead wire 143 to the light assembly 155.

By this construction, the power directed to the normally off switch contact 81 is transmitted without wires through the hollow, insulated support tube 19 by means of the drive bar 53 and through the brush contact 136 to the lead wire 143 to the light assembly.

Since there are no wires between the switch and the light assembly along the length of the support tube 19, it appears that all that is needed to adapt the present assembly to a particular size of vehicle with a particular width of vehicle pillar is to shorten or cut off the support tube 19 and corresponding drive bar 53 to the desired length before assembly into the head housing 98.

Accordingly, there is eliminated the need for stocking a large series of sizes of spot light assembly and particularly, as to the length of the support tube 19 and the corresponding drive bar 53.

Thus, the drive bar 53 performs the additional function of serving as the electrical conductor from the switch through the contact stud 135 to the light assembly.

Due to this construction, it is now possible to cut the outer tube and the drive shaft of the spot light to any desired length. By insulating the outer tube, all gears, the drive shaft, and lamp mounting stud, electric current is connected to the lamp free from all outside grounded metal parts.

Having described my invention, reference should now be had to the following claims.

I claim:

1. In a spot light assembly including a support tube journalled and retained upon a frame, having a handle assembly secured over one end of said tube, a head assembly secured over the other end of said tube and mounting a spot light, rotation of the handle assembly in a vertical plane effecting a corresponding angular adjustment of the spot light in a vertical plane, a rotatable drive shaft within said tube with its ends extending respectively into said handle assembly and head assembly, an upright stud mounted in said head assembly, said handle asembly including a handle rotatable in a horizontal plane, and intermeshing gear means on said handle, on end portions of said drive shaft and on said stud, and connected to said spot light, whereby rotation of said handle in a horizontal plane effects corresponding rotation of the spot light in a horizontal plane; the improvement comprising:
- said drive shaft at one end being in brush contact with said stud;
- a lead wire interconnecting said stud and spot light; and
- a normally opened switch in said handle assembly connected to an electric power source, and including a spring-biased retracted contact spaced from the other end of said drive shaft;
- said handle assembly including an open-ended housing receiving one end of said support tube; said intermeshing gear means including a pair of bevel gears journalled on said housing in insulated relation; and a plastic handle journalled upon and depending from said housing and connected to one of said bevel gears;
- the connection of said handle to one of said bevel gears including an axial shaft on said gear at one end secured within said handle for rotation in unison, there being an annular groove in said shaft; a plastic switch-holding cap mounted over one end of said housing and secured thereto; and a bifurcated tongue on said cap extending into said shaft groove and anchoring said handle upon said housing.

2. In a spot light assembly incuding a support tube journalled and retained upon a frame, having a handle assembly secured over one end of said tube, a head assembly secured over the other end of said tube and mounting a spot light, rotation of the handle assembly in a vertical plane effecting a corresponding angular adjustment of the spot light in a vertical plane, a rotatable drive shaft within said tube with its ends extending respectively into said handle assembly and head assembly, an upright stud mounted in said head assembly, said handle assembly including a handle rotatable in a horizontal plane, and intermeshing gear means on said handle, on end portions of said drive shaft and on said stud, and connected to said spot light, whereby rotation of said handle in a horizontal plane effects corresponding rotation of the spot light in a horizontal plane; the improvement comprising:
- said drive shaft at one end being in brush contact with said stud;
- a lead wire interconnecting said stud and spot light; and
- a normally opened switch in said handle assembly connected to an electric power source, and including a spring-biased retracted contact spaced from the other end of said drive shaft;
- said head assembly including a housing receiving one end of said support tube; said intermeshing gear means including a pair of bevel gears journalled upon said housing in insulated relation thereto; said spot light including a shell as its base movably mounted on said housing and overlying said head stud and connected to one of said bevel gears in insulated relation and for rotation therewith;
- the mounting of said shell including a nylon locking ring on said head stud internally interlocked with one of said bevel gears; a retaining washer internally interlocked with said locking ring, the base portion of said shell being interposed between said locking ring and retaining washer and secured thereto.

* * * * *